United States Patent [19]

Kosarzecki

[11] 4,341,148
[45] Jul. 27, 1982

[54] HYDRAULIC SEQUENCING VALVE

[75] Inventor: Constantine Kosarzecki, Schaumburg, Ill.

[73] Assignee: Modular Controls Corporation, Villa Park, Ill.

[21] Appl. No.: 192,642

[22] Filed: Sep. 30, 1980

[51] Int. Cl.³ .................. F15B 11/15; A01B 3/30
[52] U.S. Cl. ...................... 91/356; 91/517; 172/209; 172/225
[58] Field of Search ........... 60/380; 91/356, 512, 91/517; 137/106; 172/209, 210, 211, 212, 224, 225

[56] References Cited

U.S. PATENT DOCUMENTS

| | | | |
|---|---|---|---|
| 2,927,558 | 3/1960 | Smilges | 91/356 X |
| 3,665,810 | 5/1972 | Parrett | 91/420 |
| 3,679,179 | 7/1972 | Praddaude | 91/517 X |
| 3,799,032 | 3/1974 | Honeycutt | 91/420 |
| 3,817,154 | 6/1974 | Martin | 91/420 |
| 3,955,478 | 5/1976 | Feucht | 92/85 B |
| 4,206,685 | 6/1980 | Pusch | 91/356 |
| 4,207,951 | 6/1980 | Wilcox | 172/225 |
| 4,300,584 | 11/1981 | Kosarzecki | 137/106 |

FOREIGN PATENT DOCUMENTS 208159 8/1956 Australia ................. 91/356

Primary Examiner—Robert G. Nilson
Attorney, Agent, or Firm—Trexler, Bushnell & Wolters, Ltd.

[57] ABSTRACT

There is disclosed a new and improved hydraulic sequencing valve of the type which includes a movable valve spool within the body to sequence operation of the valve. An aperture through one spool or chamber is arranged for direct fluid communication with a tank port upon initial movement of the spool to increase the differential fluid pressure across the chambers and accelerate the sequencing movement of the spool.

20 Claims, 4 Drawing Figures

HYDRAULIC SEQUENCING VALVE

BACKGROUND OF THE INVENTION

The present invention relates generally to hydraulic valves, and more particularly, to a new and improved hydraulic sequencing valve.

Many modern hydraulic circuits include elements which must be operated in a sequential or cyclic manner. For example, hydraulic circuits used in refuse compactors must operate so as to extend a ram and compact the refuse material. When the ram reaches the end of its stroke, the hydraulic circuit automatically operates so as to reverse the direction of ram travel and return the ram to its original or start position. In other machines and circuits, hydraulically powered motors are operated to provide a motion in a given direction, and thereafter in a reverse direction and to return related machine elements to an original or start position. Machine operation is then halted.

One specific application for such a hydraulic sequencing valve is in a roll-over plow system. In such a system, it is necessary for the plow to be rolled or turned over in between succeeding rows. The hydraulic sequencing valve to be described hereinafter is particularly adapted for use in such a system.

It is therefore a general object of the present invention to provide an improved hydraulic sequencing valve.

It is a more particular object of the present invention to provide a hydraulic sequencing valve which includes an internal valve spool which is movable between first and second positions for sequencing the operation of the valve and wherein means are provided for accelerating the sequencing motion of the internal valve spool.

It is a further object of the present invention to provide such a hydraulic sequencing valve wherein the internal spool defines with the body of the valve fluid flow paths between a pair of line ports and tank and pump ports and wherein the spool and valve body further define a direct fluid path between one side of the spool and the tank port for creating a pressure differential between internal chambers of the spool upon initial sequencing movement of the spool to positively accelerate the sequencing motion of the spool.

It is also a further object of the present invention to provide such a hydraulic sequencing valve which includes a counterbalance valve for continuously metering the flow of fluid from the valve in one operating mode.

SUMMARY OF THE INVENTION

The invention provides an improved hydraulic sequencing valve including a valve body defining first and second line ports, a pump port, a tank port, and an internal bore. A hollow valve spool is disposed within the internal bore and includes a partition intermediate its ends dividing the spool into first and second chambers. An orifice within the partition provides fluid communication between the chambers. The spool is movable within the internal bore between first and second positions and defines with the valve body first fluid flow paths from the pump port to the first line port and from the second line port to the tank port when in the first position, and second fluid flow paths from the pump port to the second line and from the first line port to the tank port when in the second position. The spool first chamber is in continuous fluid communication with the pump port. The hydraulic sequencing valve further includes sequence control valve means disposed in fluid communication between the spool second chamber and the tank port and is arranged to open when the fluid pressure within the spool second chamber transmitted thereto through the spool orifice reaches a predetermined pressure for providing a restricted fluid path from the second chamber to the tank port for creating a pressure differential between the chambers and causing initial movement of the spool from the first position toward the second position. Lastly, aperture means are provided in the spool second chamber to define with the valve body a direct fluid flow path from the second chamber to the tank port upon the initial movement of the spool toward the second position for increasing the pressure differential between the chambers and accelerating the movement of the spool to the second position.

In accordance with a preferred embodiment of the present invention, the sequencing valve further includes a counterbalance valve within the fluid flow path from one of the line ports to the tank ports for continuously metering the flow of fluid through the valve when in one mode of operation.

BRIEF DESCRIPTION OF THE DRAWING

The features of the present invention which are believed to be novel are set forth with particularity in the appended claims. The invention, together with further aspects and advantages thereof, may best be understood by making reference to the following description in conjunction with the accompanying drawings, and the several figures of which like reference numerals identify identical elements, and wherein:

DESCRIPTION OF THE PREFERRED EMBODIMENTS

Figure 1:
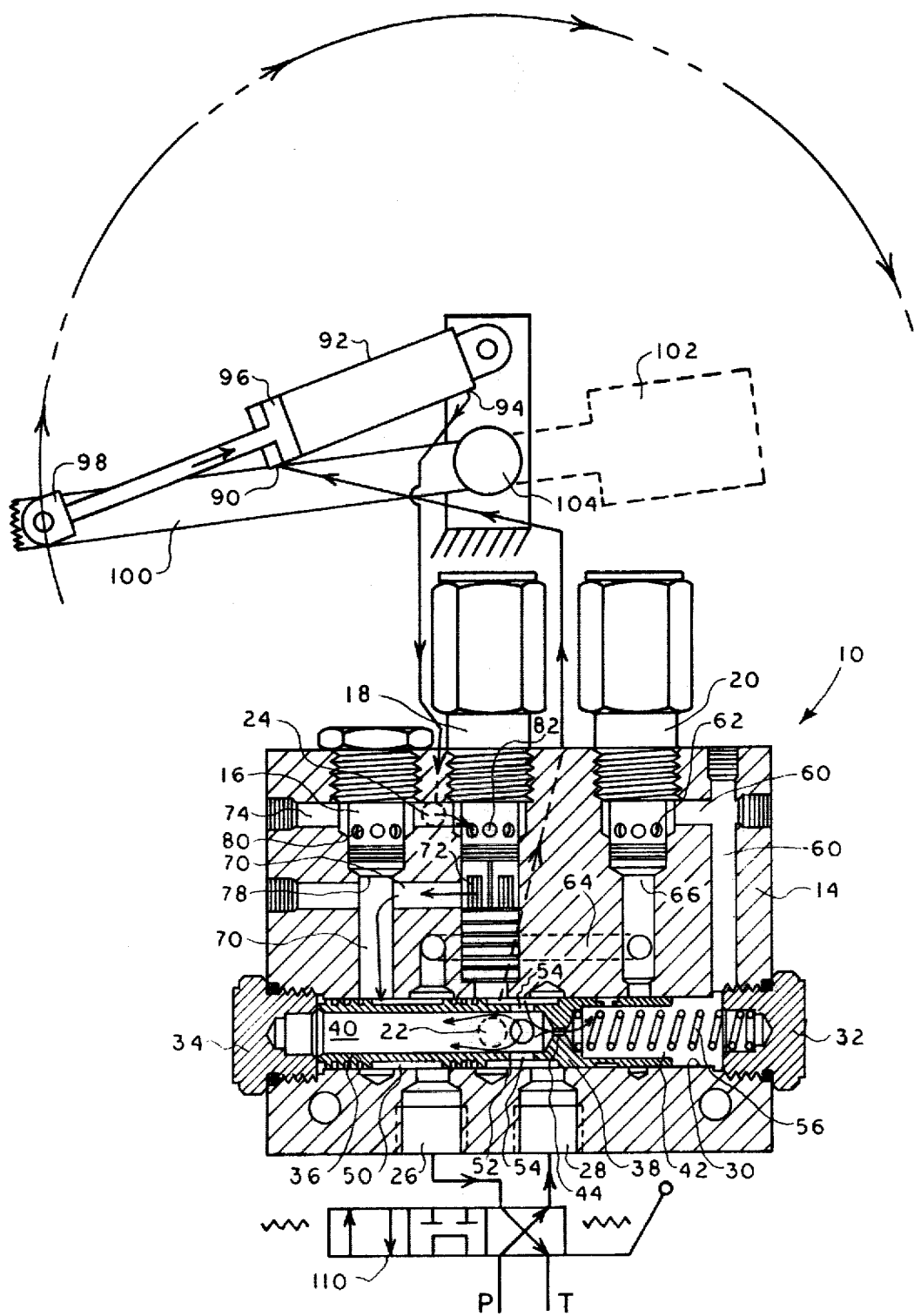
FIG. 1 is a cross sectional view of a hydraulic sequencing valve embodying the present invention shown in a schematically illustrated roll-over plow system with the various elements thereof positioned for a first mode of operation.

Referring now to FIG. 1, the hydraulic sequencing valve 10 embodying the present invention generally includes a valve body 14 formed from a solid block of metallic material, a check valve 16, a counterbalance valve 18, and a sequence control valve 20. The valve body 14 defines a first line port 22, a second line port 24, a tank port 26, and a pump port 28 adapted to be coupled to a source of hydraulic fluid under pressure.

Figure 3:
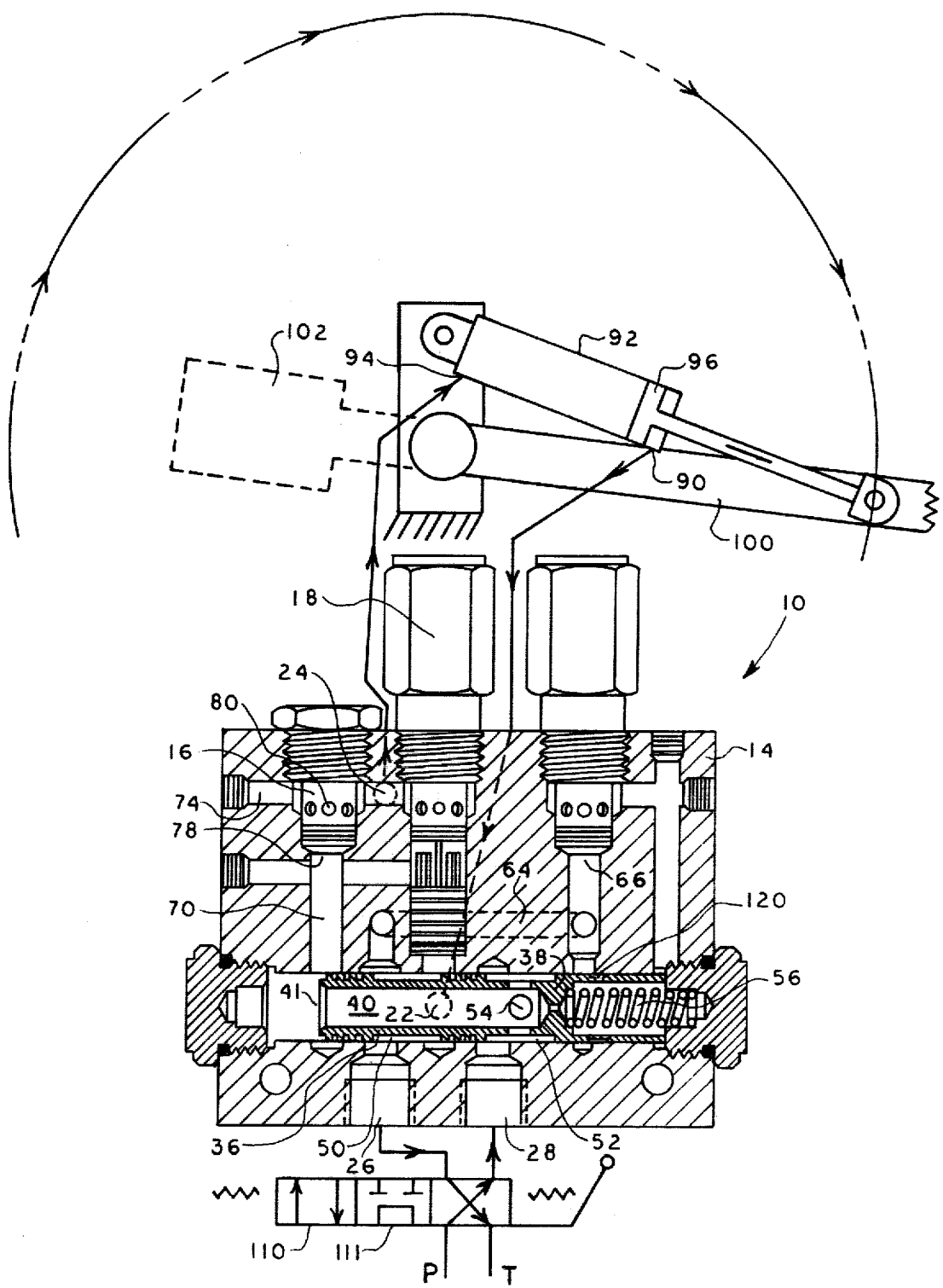
FIG. 3 is a cross sectional view similar to FIGS. 1 and 2 illustrating the operation of the hydraulic sequencing valve embodying the present invention during a second mode of operation.

The valve body 14 further includes an internal bore 30 which is enclosed by suitable caps 32 and 34 threadingly received by the valve body 14. Within the internal bore 38, there is disposed a movable valve spool 36 which, as will be described subsequently, moves between a first position as illustrated in FIG. 1 to a second position as illustrated in FIG. 3 within the internal bore 30 for sequencing the operation of the valve 10. The spool 36 is internally hollow defining cylindrical sidewalls and includes a partition 38 intermediate its ends to divide the spool into a first chamber 40 and a second chamber 42. The partition 38 further includes an orifice 44 which provides fluid communication between the first chamber 40 and second chamber 42.

The valve spool 36 further includes first and second outer annular recesses 50 and 52 respectively and a plurality of apertures 54 communicating with the recess 52. The recess 50 allows fluid flow about the valve spool 36 to the tank port 26. The recess 52 and apertures 54 permit fluid to enter the first spool chamber 40 from the pump port 28.

Disposed within the spool second chamber is a coiled spring 56 which extends between the cap 32 and partition 38 and cocks the valve spool into the first position as illustrated. As will be made clear subsequently, the spring 56 further serves to return the spool 36 to the first position after the valve has sequenced.

The valve body 14 further includes a plurality of bores which define fluid conducting channels. An L-shaped channel 60 provides fluid communication between the spool second chamber 42 and the input 62 of the sequencing control valve 20. An internal conduit 64 provides fluid communication between the output 66 of the sequence control valve 20 and the recess 50 of the valve spool 36 and thus the tank port 26.

Another L-shaped channel 70 provides fluid communication between the output 72 of the counterbalance valve 18 and the recess 50 for fluid flow to the tank port 26 and for fluid flow to the input 78 of the check valve 16. A further conduit 74 provides fluid communication between the output 80 of the check valve 16, the second line port 24, and the input 82 of the counterbalance valve 18.

The first line port 22 is in fluid communication with the recess 52 of the valve spool 36 and is adapted for connection to one end 90 of a hydraulic cylinder 92. The second line port 24 is adapted for fluid communication to the other end 94 of the cylinder 92. The cylinder 92 is provided with a piston 96 having an end 98 pivotally coupled to a member 100 to be pivoted, such as a roll-over plow. At one end of the member 100 there is shown a counterweight 102 to denote that the weight distribution across the member 100 is uneven with respect to a pivot connection 104.

When it is desired to pivot the member 100 such as in rolling over a plow, a control valve 110 is set in the position as illustrated for connecting the pump port 28 to the fluid under pressure and the tank port 26 to the tank of the system. As a result, fluid will flow through the valve 10 through first fluid flow paths defined by the valve spool 36 and the valve body 14. Fluid flow from the pump is directed into the pump port 28, through the recess 52, and into the first chamber 40 through the apertures 54. Fluid also flows from the recess 52 into the first line port 22 and then to the first end 90 of the cylinder 92. This fluid flow causes the piston 96 to move from the cylinder first end towards the cylinder second end.

Fluid displaced from the cylinder due to the movement of the piston 96 is conducted from the cylinder second end 94 to the second line port 24 and into the counterbalance valve input 82 through the channel 74. The fluid then flows out of the counterbalance valve output 72, through the channel 70, around the valve spool 36 within the recess 50 and to the tank port 26 and the tank of the system.

Figure 2:
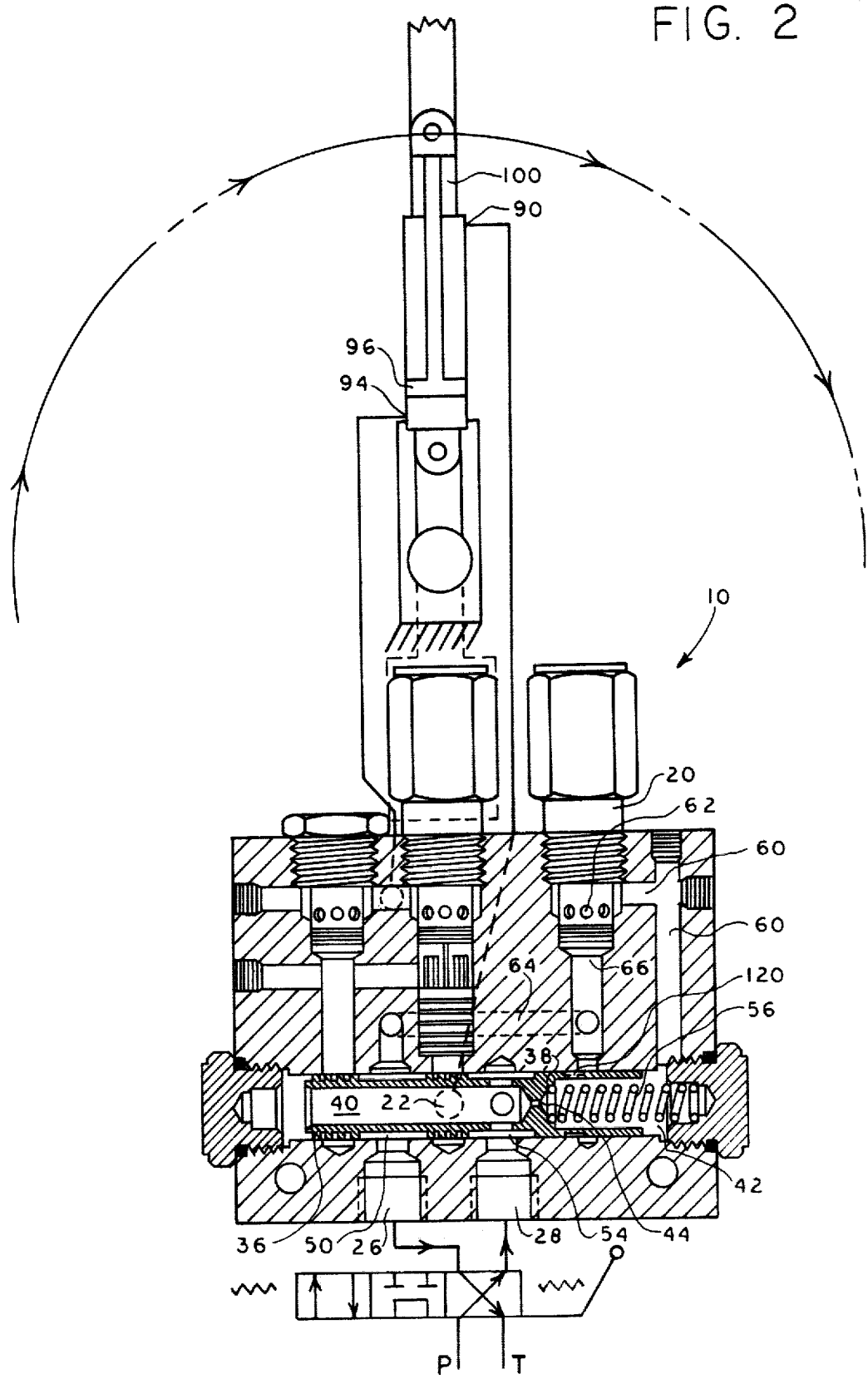
FIG. 2 is a cross sectional view of the hydraulic sequencing valve of FIG. 1 with the various elements thereof positioned for a transitional mode of operation during the sequencing thereof.

Fluid will flow through the first fluid flow paths as just described until the roll-over plow 100 reaches an intermediate position as shown in FIG. 2. As the piston 96 reaches its limit towards the cylinder second end 94 a pressure will be built up behind the piston and sensed at the piston first end 90. The build up in pressure at the piston first end 90 will be sensed at the first line port 22 so that the fluid flowing from the pump into the pump port 28 will enter the first chamber 40 through the recess 54 and then flow through the orifice 44 of partition 38 into the second chamber 42. The build up in pressure within the chamber 42 is transmitted to the input 62 of the sequence control valve 20 through the channel 60. When the pressure within the chamber 42 reaches a predetermined pressure, the sequence control valve 20 will open to provide a restricted fluid flow path from the second chamber 42, through the channel 60, through the valve and out its output 66, through the conduit 64, around the spool 36 through the recess 50, and out the tank port 26 to the tank of the system. This restricted fluid flow path reduces the pressure within the second chamber 42 so that a pressure differential will exist between the first chamber 40 and second chamber 42 across the partition 38. The differential in pressure acts against the coiled spring 56 to force the spool 36 towards the second position or towards the right as illustrated in FIG. 2.

The cylindrical wall defining the second chamber 42 also includes an aperture 120 which, upon the initial movement of the spool 36 towards its second position, will communicate with the conduit 64 to provide a direct fluid flow path from the second chamber 42 to the tank port 26 through the conduit 64 and the recess 50. As a result, the second chamber 42 is quickly reduced in pressure substantially to that of the tank to thereby increase the pressure differential across the partition 38. This increase in pressure differential will cause the valve spool 36 to accelerate in its movement towards the second position to positively sequence the operation of the valve 10.

Referring now to FIG. 3, here the valve 10 is shown with the spool 36 firmly seated in its second position. As may be noted in FIG. 3, the aperture means 120 is now in continuous fluid communication with the conduit 66 to thereby maintain the pressure differential across the partition 38 and to retain the spool 36 in its second position.

When the spool is in the second position as illustrated, it defines with the valve body 14 a second fluid flow path. This path comprises a flow path from the pump into the pump port 28, around the recess 52 into the apertures 54 and thus into the spool first chamber 40. Fluid continues to flow out the end of the spool 41 into the channel 70, the input 78 of check valve 16, out the output 80, and into the second line port 24 through the channel 74. The fluid then flows from the second line port 24 to the cylinder second end 94. The fluid entering the cylinder second end forces the piston 96 towards the cylinder first end as illustrated.

As the piston 96 so moves, the fluid above the piston 96 is forced from the cylinder first end 90 and into the first line port 22. The fluid then flows from the first line port 22 through the recess 50 about the spool 36 and into the tank port 26 and back to the tank of the system.

As will be noted from the foregoing, the check valve 16 is disposed in fluid communication within the second fluid flow path which extends from the pump port 28 to the second line port 24. In being so disposed, the check valve 16 serves to bypass the counterbalance valve 18 which was previously disposed in the first fluid flow path between the second line port 24 and the tank port 26.

After the roll-over plow 100 has reached its final position as illustrated, the system may be activated by operating the valve 110 to its center position 111 to cause the fluid to bypass the valve 10 and to thereby place the pump in direct fluid communication with the tank. At this point in time, fluid flow through the valve 10 ceases and allows the coiled spring 56 to act upon the piston 36 for moving the piston 36 back to its first position as illustrated in FIG. 1. The valve 10 is therefore re-cocked and ready for another sequencing operation.

Figure 4:
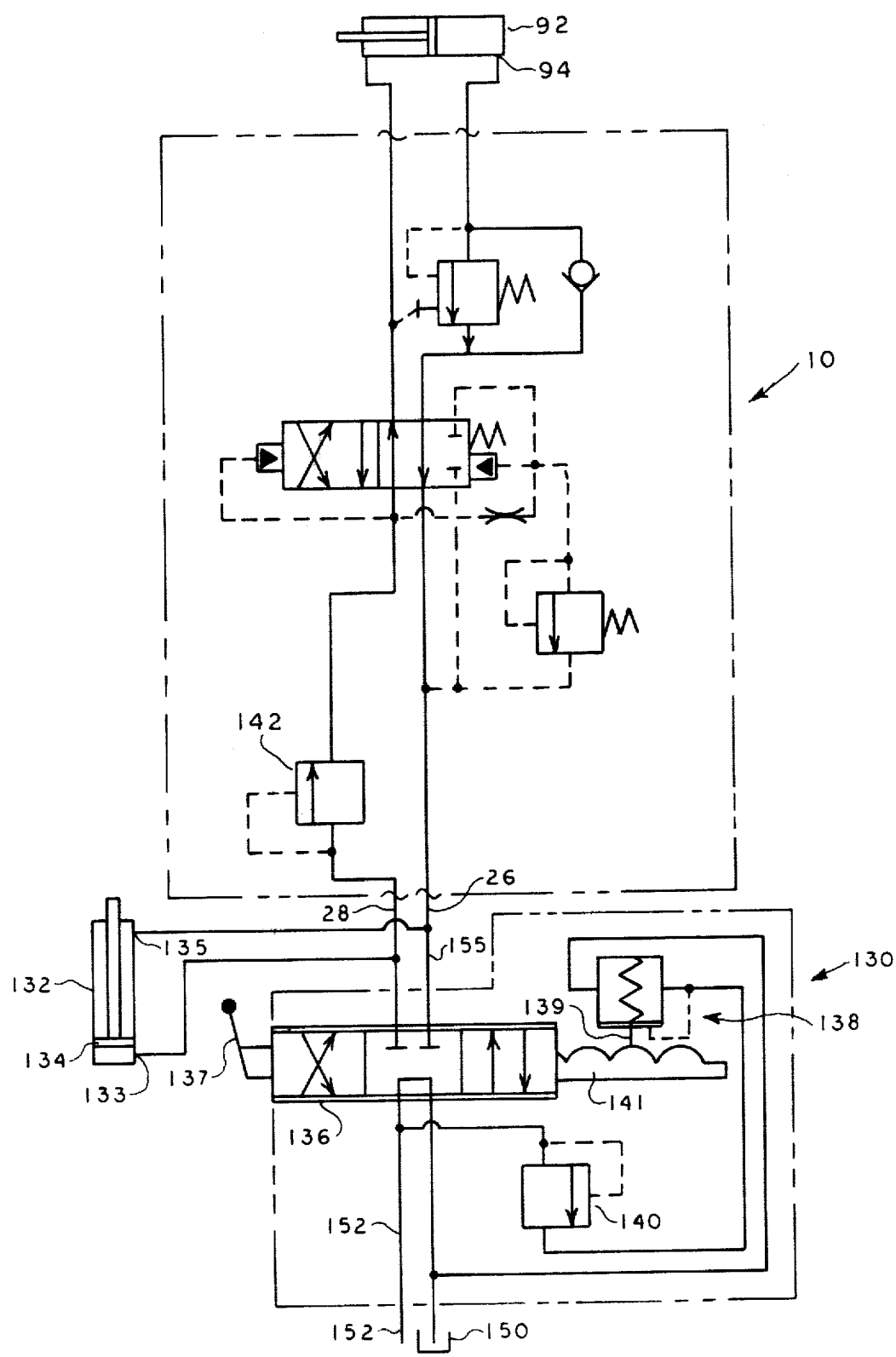
FIG. 4 is a schematic diagram illustrating the hydraulic sequencing valve of the present invention in association with a plow raising and lowering means in accordance with a further embodiment of the present invention.

Referring now to FIG. 4, the hydraulic sequencing valve 10 is shown schematically illustrated in conjunction with the cylinder 92, and a control valve system 130. The control valve system 130 is provided for automatically raising the plow before it is rolled over and for lowering the plow thereafter. To that end, the system 130 includes another cylinder 132 having a piston 134 which is shown in its lowered position prior to raising the plow. The system 130 also includes a control valve 136 and a valve actuator 138. The system also includes a first pressure control valve 140, and a second pressure control valve 142 preferably disposed within and a part of the hydraulic sequencing valve 10.

When receiving fluid from a line or when exhausting fluid into a line, the valve actuator 138, and more particularly an arm 139 mechanically affixed to a portion thereof, causes another arm 141 mechanically affixed to a portion of the control valve 136 to move, which in turn, causes the control valve 136 to move as described below. One such type of valve actuator is shown in U.S. Pat. No. 3,614,913 and is, well known in the art; this actuator employs spring-bias means functionally attached to an operating arm whereby the spring-bias means co-operates with the fluid to cause the operating arm to be subjected to reciprocating motion.

When it is desired to roll the plow over, the operator operates the control handle 137 of the valve 136 to move the valve 136 to the left to place the tank port 26 in fluid communication with the tank 150 and to place the pump port 28 in fluid communication with the pump line 152. The pressure control valve 142 precludes initial fluid flow into the pump port 28 so that fluid will flow from the pump line 52, through the valve 136, and into the first end 133 of the cylinder 132. This causes the piston 134 to rise for raising the plow. As the piston 134 raises, the fluid above the piston 134 is displaced and forced from the piston second end 135 into the tank line 155, through the valve 136, and back to tank 150. When the piston 134 is fully extended, a pressure will build up at the piston first end 133 and will be transmitted from the cylinder first end 133, through the pump port 28 of the valve 10, and to the second pressure control valve 142. When the pressure reaches a predetermined pressure at the valve 142, it will open to permit fluid to flow into the valve 10. The fluid flowing into the valve 10 will cause the cylinder 92 to operate as previously described through the sequencing modes of the valve 10. After the plow has been rolled over, a pressure build up will exist at the cylinder second end 94 which is transmitted back to the pump port 28 of the valve 10. This pressure is then conveyed through the valve 136 to the first pressure responsive valve 140. When the pressure at the pressure responsive valve 140 reaches a predetermined pressure, it will open to provide fluid to the actuator 138. The actuator 138 includes an arm 139 coacts with an arm 141 of the valve 136 to move the valve 136 through its neutral position as illustrated to its position opposite the first position. When in this position, the valve 136 provides fluid communication between the pump line 152 and the line 155 and between the cylinder first end 133 and the tank 150. This will provide fluid to the cylinder 132 to cause the piston 134 to move downwardly for lowering the roll-over plow. When the plow has been lowered, a pressure build up will exist at the cylinder second end 135 which is transmitted to the first pressure sensitive valve 140 through the valve 136. When the predetermined pressure is reached at the valve 140, the valve 140 opens to provide fluid to the actuator 138. The actuator 138 then once again coacts with the arm 141 to move the valve 136 towards the left and back to its neutral position as illustrated. After this sequence of operation, the roll-over plow system is ready for resequencing upon completion of the next row of plowing.

While particular embodiments of the present invention have been shown and described, modifications may be made, and it is therefore intended to cover all such changes and modifications which fall within the true spirit and scope of the invention.

The invention is claimed as follows:

1. An improved hydraulic sequencing valve comprising: a valve body defining first and second line ports, a pump port, a tank port, and an internal bore; a valve spool within said internal bore including a partition intermediate its ends dividing said spool into first and second chambers and having an orifice providing fluid communication between said chambers, said spool being movable within said internal bore between first and second positions and defining with said valve body first fluid flow paths from said pump port to said first line port and from said second line port to said tank port when in said first position, and second fluid flow paths from said pump port to said second line port and from said first line port to said tank port when in said second position, said spool first chamber being in continuous fluid communication with said pump port; sequence control valve means disposed in fluid communication between said spool second chamber and said tank port and arranged to open when the fluid pressure within said spool second chamber transmitted thereto through said spool orifice reaches a predetermined pressure for providing a restricted fluid path from said second chamber to said tank port for creating a pressure differential between said chambers and causing initial movement of said spool from said first position toward said second position; and aperture means in said spool second chamber defining with said valve body a direct fluid flow path from said second chamber to said tank port upon said initial movement of said spool toward said second position for increasing the pressure differential between said chambers and accelerating the movement of said spool to said second position.

2. A sequencing valve as defined in claim 1 wherein said sequence control valve means includes an input in fluid communication with said second chamber when said spool is in said first position and an output, and wherein said valve body includes conduit means providing fluid communication between said output and said tank port.

3. A sequencing valve as defined in claim 2 wherein said conduit means is also arranged to be aligned with said aperture means and provide said direct fluid path between said second chamber and said tank port upon said initial movement of said spool toward said second position.

4. A sequencing valve as defined in claim 3 wherein said conduit means is disposed for continuous fluid communication with said aperture means when said spool is in said second position for maintaining said pressure differential between said chambers and causing said spool to remain in said second position.

5. A sequencing valve as defined in claim 1 wherein said fluid flow paths to said tank port includes an annular recess in the outer surface of said spool for conducting fluid to said tank port around said spool.

6. A sequencing valve as defined in claim 5 wherein said fluid flow paths from said pump port includes said spool first chamber.

7. A sequencing valve as defined in claim 1 further comprising a counterbalance valve within the fluid flow path from one of said line ports to said tank port.

8. A sequencing valve as defined in claim 7 further comprising a check valve within the fluid flow path from said pump port to said one line port.

9. A sequencing valve as defined in claim 7 wherein said counterbalance valve is within said fluid flow path from said second line port to said tank port.

10. A sequencing valve as defined in claim 9 further comprising a check valve within the fluid flow path from said pump port to said second line port.

11. In a hydraulic sequencing valve which provides fluid flow from a pump port to a first line port and fluid flow from a second line port to a tank port when in a first operative mode, and fluid flow from the pump port to the second line port and fluid flow from the first line port to the tank port when in a second operative mode, and of the type having a valve element movable from a first position to a second position for automatically sequencing the valve from the first operative mode to the second operative mode responsive to a differential fluid pressure across opposite sides of the valve element, the improvement comprising: first means in fluid communication between one side of the valve element and the tank port and arranged for establishing a restricted fluid flow path from said one side of said valve element to the tank port to create a first differential fluid pressure across said valve element for causing initial movement of said valve element from said first position towards said second position; and second means arranged for providing direct fluid communication between said one side of said valve element and said tank port upon said initial movement of said valve element for creating a second larger differential fluid pressure across said valve element for accelerating the movement of said valve element to said second position.

12. A sequencing valve as defined in claim 11 wherein said valve element comprises a hollow valve spool having a cylindrical wall, a partition separating said spool into first and second spool chambers and an orifice through said partition, said spool first chamber being in fluid communication with said pump port and said orifice being arranged for transferring fluid pressure from said spool first chamber to said spool second chamber.

13. A sequencing valve as defined in claim 12 wherein said first means comprises a pressure sensitive control valve in fluid communication with said spool second chamber and arranged to open responsive to a predetermined pressure within said spool second chamber for providing said restricted flow path to said tank port.

14. A sequencing valve as defined in claim 12 wherein said second means comprises an aperture within said second chamber through said cylindrical wall of said spool and arranged for direct fluid communication with said tank port upon said initial movement of said spool.

15. A sequencing valve as defined in claim 14 wherein said aperture is further arranged to be in continuous direct fluid communication with said tank port as long as said spool is in said second position for maintaining said final differential pressure across said spool for holding said spool in said second position.

16. In a roll-over plow system of the type including a hydraulic cylinder having a movable piston therein with an end coupled to pivot means for rolling the plow over from an initial position, through a predetermined angular distance including an intermediate position, to a final position as the piston reciprocates between opposite ends of the cylinder, an improved hydraulic sequencing valve for controlling fluid flow to and from the cylinder to cause the reciprocal movement of the piston within the cylinder, said hydraulic sequencing valve comprising: a valve body having a pump port adapted to be coupled to a fluid source under pressure, a tank port, a first line port adapted to be coupled to one end of the cylinder, and a second line port adapted to be coupled to the other end of the cylinder, and an internal bore; a valve spool within said internal bore including a partition intermediate its ends dividing said spool into first and second chambers and having an orifice providing fluid communication between said chambers, said spool being movable within said internal bore between first and second positions and defining with said valve body first fluid flow paths from said pump port to said first line port and from said second line port to said tank port when in said first position to cause the piston to move from one end of the cylinder to the other for rolling the plow from said initial position to said intermediate position, and second fluid flow paths from said pump port to said second line port and from said first line port to said tank port when in said second position to cause the piston to reciprocally move from said other end of the cylinder back to said one end for continued rolling of the plow from said intermediate position to said final position, said spool first chamber being in continuous fluid communication with said pump port; sequence control valve means disposed in fluid communication between said spool second chamber and said tank port and arranged to open when the fluid pressure within said spool second chamber transmitted thereto through said spool orifice reaches a predetermined pressure for providing a restricted fluid path from said second chamber to said tank port for creating a pressure differential between said chambers and causing initial movement of said spool from said first position toward said second position, and aperture means within said spool second chamber defining with said valve body a direct fluid flow path from said second chamber to said tank port upon said initial movement of said spool and as the plow reaches said intermediate position for increasing the pressure differential between said chambers and accelerating the movement of said spool to said second position.

17. A roll-over plow system as defined in claim 16 wherein said sequencing valve further includes a counterbalance valve within the fluid flow path from one of said line ports to said tank port.

18. A roll-over plow system as defined in claim 17 wherein said counterbalance valve is within said fluid flow path from said second line port to said tank port.

19. A roll-over plow system as defined in claim 16 further including plow lifting means for lifting the plow prior to the angular displacement thereof and wherein said sequencing valve further includes actuating means responsive to said lifting means for providing fluid to said valve body after said plow has been lifted.

20. A roll-over plow system as defined in claim 19 wherein said lifting means is further arranged to lower the plow after the plow reaches said final position.

* * * * *